United States Patent [19]

Mignard et al.

[11] Patent Number: 5,834,522
[45] Date of Patent: Nov. 10, 1998

[54] HYDROISOMERIZATION TREATMENT PROCESS FOR FEEDS FROM THE FISHER-TROPSCH PROCESS

[75] Inventors: Samuel Mignard, Chatou; Nathalie Marchal, Paris; Slavik Kasztelan, Rueil Malmaison; Pierre-Henri Bigeard, Vienne; Alain Billon, Le Vesinet, all of France

[73] Assignee: Institut Francais du Petrole, France

[21] Appl. No.: 553,654

[22] PCT Filed: Mar. 22, 1995

[86] PCT No.: PCT/FR95/00353

§ 371 Date: Jul. 5, 1996

§ 102(e) Date: Jul. 5, 1996

[87] PCT Pub. No.: WO95/27020

PCT Pub. Date: Oct. 12, 1995

[30] Foreign Application Priority Data

Apr. 1, 1994 [FR] France ................................ 94 03869

[51] Int. Cl.$^6$ .................................................. C07C 27/00

[52] U.S. Cl. .................. 518/700; 518/705; 585/253; 585/737; 208/18; 208/27; 208/143

[58] Field of Search .......................... 585/253; 208/143; 518/700, 705

[56] References Cited

U.S. PATENT DOCUMENTS

| | | |
|---|---|---|
| 3,843,509 | 10/1974 | Suto et al. . |
| 4,648,958 | 3/1987 | Ward . |
| 5,151,172 | 9/1992 | Kukes . |
| 5,248,409 | 9/1993 | Soled et al. . |

FOREIGN PATENT DOCUMENTS

| | | |
|---|---|---|
| 0 321 307 | 6/1989 | European Pat. Off. . |
| 0 323 092 | 7/1989 | European Pat. Off. . |
| 0 532 116 | 3/1993 | European Pat. Off. . |
| 0 533 451 | 3/1993 | European Pat. Off. . |
| 2 563 120 | 10/1985 | France . |

*Primary Examiner*—Michael L. Shippen
*Attorney, Agent, or Firm*—Millen, White, Zelano & Branigan, P.C.

[57] ABSTRACT

The invention concerns a process for the hydroisomerisation treatment for feeds from the Fischer-Tropsch process. The catalyst is essentially constituted by 0.05% to 10% by weight of a precious metal and a silica (5–70%)/alumina support with a specific surface area of 100–500 m$^2$/g. The catalyst has an average pore diameter of 1–12 nm, the pore volume of pores with diameters between the average diameter ±3 nm being more than 40% of the total pore volume. The dispersion of the precious metal is 20–100% and the distribution coefficient for the precious metal is greater than 0.1. The process is operated at 200°–450° C. at a partial pressure of hydrogen of 2 to 25 MPa with a VVH of 0.1–10 h$^{-1}$ and a hydrogen/feed volume ratio of 100–2000.

24 Claims, No Drawings

5,834,522

HYDROISOMERIZATION TREATMENT PROCESS FOR FEEDS FROM THE FISHER-TROPSCH PROCESS

BACKGROUND OF THE INVENTION

The present invention concerns a hydroisomerisation treatment process for feeds from a Fischer-Tropsch process to produce lubricating oils.

In the Fischer-Tropsch process, synthesis gas (CO+$H_2$) is catalytically transformed into oxygenated products and essentially linear hydrocarbons in the gaseous, liquid or solid state. These products are generally free of heteroatomic impurities such as sulphur, nitrogen or metals. They also contain practically no aromatics, naphthenes or, more generally, cyclic compounds. They can, however, contain a significant quantity of oxygenated products which, expressed as the weight of oxygen, is less than about 5%, and less than 10% by weight of unsaturated compounds (generally olefinic compounds). These compounds cannot be used as they are, in particular because of their cold behaviour properties which are not compatible with the normal uses of petroleum cuts. The pour point of a linear hydrocarbon containing 30 carbon atoms per molecule (boiling point about 450° C., i.e., part of the oil cut), for example, is about +67° C., while customs regulations require that a commercial oil must have a pour point of less than −90° C. These hydrocarbons from the Fischer-Tropsch process must, therefore, be transformed into more valorisable products such as lubricating oils, after undergoing catalytic hydroisomerisation reactions.

All the catalysts which are currently used for hydroconversion are bifunctional, combining an acidic function with a hydrogenating function. The acidic function is provided by supports with large surface areas (generally 150 to 800 $m^2 \cdot g^1$) with surface acidity, such as halogenated aluminas (in particular chlorinated or fluorinated), phosphorous-containing aluminas, combinations of boron oxides and aluminium, amorphous silica-aluminas and silica-aluminas. The hydrogenating function is provided either by one or more metals from group VIII of the periodic classification of the elements, such as iron, cobalt, nickel, ruthenium, rhodium, palladium, osmium, iridium and platinum, or by combination of at least one metal from group VI such as chromium, molybdenum and tungsten with at least one metal from group VIII.

The balance between the acidic and hydrogenating functions is a fundamental parameter which governs the activity and selectivity of the catalyst. A weak acidic function and a strong hydrogenating function produces catalysts which are less active and selective as regards isomerisation while a strong acidic function and a weak hydrogenating function produces very active and selective catalysts as regards cracking. A third possibility is to use a strong acidic function and a strong hydrogenating function to obtain a very active but also very selective isomerisation catalyst. It is thus possible, by judicious choice of each of the functions, to adjust the activity/selectivity balance of the catalyst.

SUMMARY OF THE INVENTION

Our research on a number of silica-aluminas has led to the discovery that, surprisingly, the use of a catalyst containing neither halogen nor zeolite and comprising a particular silica-alumina can produce catalysts which are very active but also very selective as regards isomerisation of feeds as defined below.

More precisely, the catalyst of the invention is essentially constituted by 0.05–10% by weight of at least one precious metal from group VIII deposited on an amorphous silica-alumina support which contains 5–70% by weight of silica and has a BET specific surface area of 100–500 $m^2/g$, the catalyst having:

an average pore diameter of between 1–12 nm, a pore volume of pores with diameters between the average diameter as defined above reduced by 3 nm and the average diameter as defined above increased by 3 nm, of more than 40% of the total pore volume, a precious metal dispersion of between 20–100%, a distribution coefficient for the precious metal of more than 0.1.

In more detail, these characteristics are:

Silica content: the support used to prepare the catalyst described in this patent is composed of silica $SiO_2$ and alumina $Al_2O_3$. The silica content, expressed as the percentage by weight, is between 5% and 70%, preferably between 20% and 60%, more preferably between 22% and 45%. This content can be accurately measured using X ray fluorescence. It is constant over the whole of the catalyst, i.e., the silica concentration is not higher at the catalyst surface, for example. The silica in the catalyst is homogeneous.

Nature of precious metal: for this particular reaction type, the metallic function is provided by a precious metal from group VIII of the periodic classification of the elements, in particular platinum.

Precious metal content: the precious metal content, expressed in weight % of metal with respect to the catalyst, is between 0.05 and 10, preferably between 0.1 and 5.

Precious metal dispersion: The dispersion, representing the fraction of the metal which is accessible to the reactant with respect to the total quantity of metal in the catalyst, can be measured, for example, by $H_2/O_2$ titration. The metal is first reduced, i.e., it undergoes treatment in a hydrogen stream at high temperature under conditions which transform all the platinum atoms accessible to hydrogen to the metal. An oxygen stream is then passed under operating conditions which oxidise all the reduced platinum atoms which are accessible to oxygen to $PtO_2$. By calculating the difference between the quantity of oxygen introduced and the quantity of oxygen leaving, the amount or oxygen consumed can be deduced. This value allows the quantity of platinum which is accessible to oxygen to be deduced. The dispersion is thus equal to the ratio of the quantity of platinum which is accessible to oxygen over the total quantity of platinum in the catalyst. In our case, the dispersion is between 20% and 100%, preferably between 30% and 100%.

Precious metal distribution: the distribution of the precious metal represents the distribution of the metal inside a grain of the catalyst, the metal being well or poorly dispersed. Thus it is possible to obtain poorly distributed platinum (detected, for example, in a ring in which the thickness is substantially lower than the radius of the grain) but which is well dispersed, i.e., all the platinum atoms in the ring are accessible to the reactants. In our case, the platinum distribution is good, i.e., the platinum profile, measured using the Castaing microprobe analysis method, has a distribution coefficient for more than 0.1, preferably more than 0.2.

BET surface area: the BET surface area of the support is between 100 $m^2/g$ and 500 $m^2/g$, preferably between 250 m²/g and 450 m²/g, more preferably between 310 m²/g and 450 m²/g.

Average pore diameter: the average pore diameter of the catalyst is measured from a pore distribution profile obtained using a mercury porosimeter. The average pore diameter is defined as the diameter corresponding to the zero point of the curve derived from the mercury porosity curve. The average pore diameter, as defined, is between 1 nm (1×10⁻⁹ meter) and 12 nm (12×10⁻⁹ meter), preferably between 2.5 nm (2.5×10⁻⁹ meter) and 11 nm (11×10⁻⁹ meter), more preferably between 4 nm (4×10⁻⁹ meter) and 10.5 nm (10.5×10⁻⁹ meter), and advantageously between 3 and 9 nm.

Pore distribution: the catalyst of this patent has a pore distribution such that the pore volume of the pores with diameters between the average diameter as defined above reduced by 3 nm and the average diameter as defined above increased by 3 nm (i.e., the average diameter ±3 nm) is more than 40% of the total pore volume, preferably between 50% and 90% of the total pore volume, more advantageously between 50% and 80% of the total pore volume and most advantageously between 50% and 70% of the total pore volume. The catalyst thus has a uniform pore distribution, more monomodal than bimodal.

Total pore volume of support: this is generally less than 1.0 ml/g, preferably between 0.3 and 0.9 ml/g, and more advantageously less than 0.85 ml/g. In general, the support has a total pore volume of more than 0.55 ml/g, preferably at least 0.6 ml/g.

The silica-alumina is prepared and formed using the usual methods which are well known to the skilled person. Advantageously, the support is calcined prior to impregnation of the metal, for example by heat treatment at 300°–750° C. (preferably 600° C.) for 0.25–10 hours (preferably 2 hours) in 2–30% by volume of steam (preferably 7.5%).

The metal salt is introduced using one of the usual methods for depositing metal (preferably platinum) on a support surface. One of the preferred methods is dry impregnation which consists in introducing the metal salt in a volume of solution which is equal to the pore volume of the catalyst mass to be impregnated. An acidic, neutral or basic solution of a metal salt (in particular platinum) is suitable. Neutral solutions (pH close to that of water) or basic solutions are preferred. Before reduction, the catalyst can be calcined, for example by treatment in dry air at 300°–750° C. (preferably 520° C.) for 25–10 hours (preferably 2 hours).

Before its use in the hydroisomerisation reaction, the metal contained in the catalyst must be reduced. One preferred method for reducing the metal is treatment in hydrogen at a temperature of between 150° C. and 650° C. at a total pressure of between 0.1 and 25 MPa. Reduction consists, for example, of a 2 hour stage at 150° C. followed by raising the temperature to 450° C. at a rate of 1° C./min then a 2 hour stage at 450° C.: during the whole of this reduction step, the hydrogen flow rate is 1000 l hydrogen/l catalyst. It should also be noted that any ex-situ reduction method is suitable.

The catalyst described is active, for example, for hydroisomerisation of feeds from the Fischer-Tropsch process, to obtain a large quantity of products resulting from the hydroisomerisation of the paraffin molecules present in the initial feed. It is of particular interest to produce products which can then be used as components of lubricating products.

The feed is brought into contact with the hydroisomerisation catalyst in a hydroisomerisation zone (or reactor) at a partial pressure of hydrogen of 2 to 25 MPa, advantageously 2 to 20 MPa, preferably 2 to 18 MPa, at a temperature of 200°–450° C., advantageously 250°–450° C., preferably 300°–450° C., and most preferably 320°–450° C., or 200°–400° C., 300°–400° C., or 320°–400° C., at an hourly space velocity of 0.1–10 h⁻¹, advantageously 0.2–10 h⁻¹, preferably 0.5–5 h⁻¹, at a hydrogen/feed volume ratio of 100 to 2000. The effluent from the hydroisomerisation reactor is fractionated into different conventional petroleum cuts such as gas, petrols, middle distillates and "isomerised residue"; the fraction termed "isomerised residue" represents the heaviest fraction obtained during fractionation and the oily fraction is extracted from this fraction. The oily fraction is traditionally extracted during an operation termed dewaxing. The choice of temperatures during the fractionation step for the effluents from the hydroisomerisation reactor can be widely varied depending on the specific requirements of the refiner.

When the amounts of unsaturated or oxygenated products is likely to cause too great a deactivation of the catalytic system, before entering the hydroisomerisation zone the feed from the Fischer-Tropsch process must be hydrotreated in a hydrotreatment zone. Hydrogen is reacted with the feed in contact with a hydrotreatment catalyst whose role is to reduce the concentration of unsaturated hydrocarbon and oxygenated molecules produced during the Fischer-Tropsch process. The effluent from this hydrotreatmen zone is then treated in the hydroisomerisation zone.

The hydrotreatment catalyst is a non cracking catalyst comprising at least one matrix, preferably alumina based, and at least one metal or metal compound which has a hydro-dehydrogenating function. This matrix can also contain silica-alumina, boron oxide, magnesia, zirconia, titanium oxide, clay or a combination of these oxides. The hydro-dehydrogenating function is preferably provided by at least one metal or metal compound from group VIII, in particular nickel or cobalt. A combination of at least one metal or metal compound from group VI (in particular molybdenum or tungsten) and at least one metal or metal compound from group VIII of the periodic classification of the elements (in particular cobalt or nickel) can be used. The hydro-dehydrogenating component can also be a precious metal (preferably platinum or palladium), for example in a concentration of 0.01–5% by weight with respect to the finished catalyst. The concentration of non precious group VIII metal, when used, is 0.01–5% by weight with respect to the finished catalyst.

This catalyst can advantageously contain phosphorous; in fact, this compound provides hydrotreatment catalysts with two advantages: ease of preparation, in particular during impregnation with solutions of nickel and molybdenum; and higher hydrogenation activity.

The total concentration of group VI and VIII metals, expressed as metal oxides, is between 5% and 40% by weight, preferably between 7% and 30% by weight, and the weight ratio of group VI metal(s) over group VIII metal(s) is between 1.25 and 20, preferably between 2 and 10, expressed as the oxide. The concentration of phosphorous oxide $P_2O_5$ is less than 15% by weight, preferably less than 10% by weight.

A catalyst containing boron and phosphorous, as described in European patent EP-A-0 297 949, can be used. The sum of the quantities of boron and phosphorous, respectively expressed as the weight of boron trioxide and phosphorous pentoxide, is about 5% to 15% with respect to the weight of support, and the atomic ratio of boron to phosphorous is about 1:1 to 2:1, and at least 40% of the total pore volume of the finished catalyst is contained in pores with an average diameter of over 13 nanometers. Preferably, the quantity of group VI metal, such as molybdenum or tungsten, is such that the atomic ratio of phosphorous to group VIB metal is about 0.5:1 to 1.5:1; the quantities of group VIB metal and group VIII metal, such as nickel or cobalt, are such that the atomic ratio of group VIII metal to group VIB metal is about 0.3:1 to 0.7:1. The quantities of group VIB metal, expressed as the weight of metal with respect to the weight of finished catalyst, is about 2% to 30% and the quantity of group VIII metal, expressed as the weight of metal with respect to the weight of finished catalyst, is about 0.01% to 15%.

Preferred catalysts are NiMo on alumina, NiMo on alumina doped with boron and phosphorous and NiMo on silica-alumina. Advantageously, eta or gamma alumina is used.

In the hydrotreatment zone, the partial pressure of hydrogen is between 0.5 and 25 MPa, advantageously 0.5–20 MPa, preferably between 2 and 18 MPa, at a temperature of is 250°–400° C., preferably 300°–380° C. Under these operating conditions, the cycle time of the catalytic system is at least one year, preferably 2 years, and the catalyst deactivation, i.e, the increase in the temperature to which the catalytic system is subjected to maintain conversion, is less than 5° C./month, preferably less than 2.5° C./month. Under these conditions, the concentration of unsaturated and oxygenated molecules is reduced to less than 0.5%, generally to about 0.1%.

The oils obtained from the process of the invention have very good properties because of their highly paraffinic character. The viscosity index (VI) of the oil obtained after dewaxing the 380+ cut in MEK/toluene solvent, for example, is greater than or equal to 130, preferably greater than 135, and the pour point is less than or equal to −12° C. The yield of oil with respect to residue depends on the total conversion of the feed. In the case of the present invention, this yield is between 5% and 100% by weight, preferably greater than 10% and more advantageously greater than 60%. In one advantageous embodiment, at least a portion of the non oily fraction, obtained during the dewaxing step of the isomerised residue, is recycled to the hydrotreatment zone and/or the hydroisomerisation zone.

The following examples illustrate the features of the invention without in any way limiting its scope.

EXAMPLE 1

Preparation of Hydroisomerisation Catalyst in accordance with the invention

The support was a silica-alumina in the form of extrudates. It contained 29.1% by weight of silica $SiO_2$ and 70.9% by weight of alumina $Al_2O_3$. Before addition of the precious metal, the silica-alumina had a surface area of 389 $m^2/g$ and an average pore diameter of 6.6 nm. The total pore volume of the support was 0.76 ml/g.

The corresponding catalyst was obtained after impregnation of the precious metal into the support. The platinum salt $Pt(NH_3)_4Cl_2$ was dissolved in a volume of solution which corresponded to the total pore volume to be impregnated. The pH of the water was 6.31 and the pH of the solution obtained was 6.07. The solid was then calcined for 2 hours in dry air at 520° C. The platinum content was 0.60% by weight. The platinum dispersion was 60% and the distribution was uniform across the grain. The catalyst had a pore volume of 0.75 ml/g, a BET surface area of 332 $m^2/g$ and an average pore diameter of 6.5 nm. The pore volume corresponding to pores with diameters between 3.5 nm and 9.5 nm was 0.44 ml/g, i.e., 59% of the total pore volume.

The pore distribution of this catalyst was as follows:

| Pore diameter | pore volume |
|---|---|
| < 6 nm | 0.16 ml/g = 21% of total |
| 6–5 nm | 0.36 ml/g = 48% |
| 15–60 nm | 0.06 ml/g = 8% |
| >60 nm | 0.17 ml/g = 23%. |

EXAMPLE 2

Evaluation of Catalyst during a test carried out under Hydroisomerisation conditions.

The catalyst whose preparation was described in the above example was used on a paraffin feed from the Fischer-Tropsch synthesis, under hydroisomerisation conditions. In order to be able to use the hydroisomerisation catalyst directly, the feed was first hydrotreated and the oxygen content reduced to below 0.1% by weight. The main characteristics were as follows:

| | |
|---|---|
| Initial boiling point | 201° C. |
| 10% point | 258° C. |
| 50% point | 357° C. |
| 90% point | 493° C. |
| Cut point | 592° C. |
| Pour point | +67° C. |
| Density (20/4) | 0.799 |

The catalytic test unit comprised a single fixed bed up-flow reactor, into which 80 ml of catalyst was introduced. The catalyst was then subjected to a pure hydrogen atmosphere at a pressure of 7 MPa to reduce the platinum oxide to platinum metal and the feed was then injected. The total pressure was 7 MPa, the hydrogen flow rate was 1000 liters of gaseous hydrogen per liter of injected feed, the hourly space velocity was 1 $h^{-1}$ and the reaction temperature was 370° C.

The table below summarises the results for the original feed and the feed after the hydroisomerisation operation.

| | Hydrotreated feed | Hydroisomerised effluent |
|---|---|---|
| Reaction temperature (°C.) | / | 370 |
| Density at 15° C. | 0.799 | 0.779 |
| wt % 390−/effluents | 65 | 80 |
| wt % 390+/effluents | 35 | 20 |
| Quality of 390+residue | | |
| Dewaxing yield | 5.5 | 41.5 |
| Oil quality | | |
| VI (viscosity index) | 155 | 142 |
| Cut distribution | | |
| IBP-220 | 1.5 | 13.3 |
| 220–370 | 53.5 | 60.6 |
| 370− | 55 | 73.9 |
| 370+ | 45 | 26.1 |
| Net selectivity of 220− | 0 | 21.5 |
| Net conversion (%) | 0 | 42 |

It can clearly be seen that the unhydroisomerised feed had a very low oil yield, while after the hydroisomerisation operation, the oil yield was very satisfactory and the oil recovered had a very high VI (VI=142) and a pour point of −21° C. In addition, calculations showed that the gross naphtha 220− yield (defined as the products with a distillation temperature of less than 220° C.) was low since it was 18% by weight for a gross conversion of 370− of 73.9% by weight.

EXAMPLE 2 bis

The same catalyst was brought into contact with the same feed, under the same conditions except that the temperature was raised to 375° C. The results are shown in the table below:

|  | Hydrotreated feed | Hydroisomerised effluent |
|---|---|---|
| Reaction temperature (°C.) | / | 375 |
| Density at 15° C. | 0.799 | 0.773 |
| wt % 390⁻/effluents | 65 | 91.8 |
| wt % 390⁺/effluents | 35 | 8.2 |
| Quality of 390⁺residue |  |  |
| Dewaxing yield | 5.5 | 60.5 |
| Oil quality |  |  |
| VI (viscosity index) | 155 | 140 |
| Cut distribution |  |  |
| IBP-220 |  | 1.5 |
| 220–370 |  | 53.5 |
| 370⁻ |  | 55 |
| 370⁺ |  | 45 |
| Net selectivity of 220⁻ |  | 0 |
| Net conversion (%) | 0 | 77 |

EXAMPLE 3

Evaluation of Catalyst of Example 1, during tests carried out without recycling and with recycling of the non oily fraction obtained after dewaxing.

The catalyst whose preparation was described in Example 1 was used under hydroisomerisation conditions with a paraffin feed from the Fischer-Tropsch synthesis described above.

The catalytic test unit was identical to that described in the previous examples. In one case, the reaction was carried out without recycling and in the other, with recycling of the non oily fraction obtained after dewaxing of the residue fraction: this non oily fraction obtained after dewaxing is normally known as "dewaxing cake". The operational conditions were adjusted to provide the same yields of residue fraction (i.e., the 390⁺ fraction).

The table below shows the catalytic performances obtained with and without recycling of the "dewaxing cake".

|  | without recycling | with recycling |
|---|---|---|
| wt % 390⁻/effluents | 80 | 74.6 |
| wt % 390⁺/effluents | 20 | 25.4 |
| Dewaxing yield | 41.5 |  |
| wt % oil/feed | 8.3 | 12.4 |
| Net conversion of 390⁻ | 42.9 | 43.2 |

In all the cases, the oils obtained had a viscosity index (VI) of more than 140 and a pour point of less than −12° C.

We claim:

1. A process for the treatment of feeds from a Fischer-Tropsch process to obtain lubricating oils, characterised in that the feed having been optionally hydrotreated is hydroisomerised in a hydroisomerisation zone, the effluent obtained is fractionated to obtain an isomerised residue, said residue being dewaxed to obtain oil and a non oily fraction, and in that the hydroisomerisation zone is operated at a temperature of 200°–450° C., at aq pressure of 2–25 MPa, with an hourly space velocity of 0.1–10 h⁻¹ and a hydrogen/hydrocarbon volume ratio of 100–2000, using a catalyst which consists essentially of a deposit consisting essentially of 0.05–100% by weight of at least one previously reduced precious metal from group VIII on an amorphous silica-alumina support, the catalyst containing neither zeolite nor halogen, said support containing a constant content of 5–45% by weight of silica and having a BET specific surface area of 100–500 m²/g, said catalyst having a homogeneous content of silica so that the silica concentration is not higher at the catalyst surface and said catalyst having an average pore diameter of 1–12 nm, the pore volume of pores with diameters between the average diameter reduced by 3 nm and the average diameter increased by 3 nm being greater than 40% of the total pore volume, the dispersion of the precious metal being between 20–100%, and the distribution coefficient of the precious metal in the catalyst being greater than 0.1.

2. A process according to claim 1, characterised in that the feed, before hydroisomerisation, is hydrotreated in a hydrotreatment zone using a catalyst comprising alumina and at least one hydro-dehydrogenation component, the temperature being 250°–400° C. and the pressure being 0.5–25 MPa.

3. A process according to claim 1, characterised in that at least a portion of the non oily fraction obtained from the dewaxing step is recycled to the hydroisomerisation zone and/or to the hydrotreatment zone.

4. A process according to claim 1, characterised in that the precious metal in the hydroisomerisation catalyst is platinum.

5. A process according to claim 1, characterised in that the silica content in the support of the hydroisomerisation catalyst is at least 20% by weight.

6. A process according to claim 4, characterised in that the silica content in the support of the hydroisomerisation catalyst is between 22% and 45% by weight.

7. A process according to claim 1, characterised in that the total pore volume in the support for the hydroisomerisation catalyst is less than 1.0 ml/g.

8. A process according to claim 6, characterised in that the hydroisomerisation catalyst has a total pore volume of at least 0.3 ml/g and less than 0.9 ml/g.

9. A process according to claim 1, characterised in that the hydroisomerisation catalyst has an average pore diameter of between 2.5 and 11 nm.

10. A process according to claim 8, characterised in that the average pore diameter is between 4 and 10.5 nm.

11. A process according to claim 1, characterised in that the hydroisomerisation catalyst has a pore volume of pores with diameters between the average diameter reduced by 3 nm and the average diameter increased by 3 nm of between 50% and 90% of the total pore volume.

12. A process according to claim 1, characterised in that the hydroisomerisation catalyst has a pore volume of pores with diameters between the average diameter reduced by 3 nm and the average diameter increased by 3 nm of 50%–80% of the total pore volume.

13. A process according to claim 10, characterised in that the hydroisomerisation catalyst has a pore volume of pores with diameters between the average diameter reduced by 3 nm and the average diameter increased by 3 nm of 50%–70% of the total pore volume.

14. A process according to claim 1, characterised in that the support for the hydroisomerisation catalyst has a specific surface area of between 250 and 450 m²/g.

15. A process according claim 1, characterised in that the support for the hydroisomerisation catalyst has a specific surface area of between 310 and 450 m²/g.

16. A process according to claim 1, characterised in that the support for the hydroisomerisation catalyst is impregnated with a neutral or basic solution of a precious metal salt, and the resultant impregnated metal salt is reduced in a reduction step to elemental metal, and wherein the impregnated catalyst is optionally calcined prior to the reduction step, said reduction step occurring prior to the hydroisomerization step.

17. A process according to claim 1, characterised in that the hydroisomerisation zone is operated at a pressure of 2–18 MPa, and a temperature of 300°–450° C.

18. A process according to claim 1, characterised in that the process is operated at a temperature of 320°–450° C.

19. A process according to claim 2, in which the hydro-dehydrogenation component is a combination of at least one metal or metal compound from group VIII and at least one metal or metal compound from group VI of the periodic classification of the elements, the total concentration of metals from groups VI and VIII, expressed as the metal oxides, being between 5% and 40% by weight and the ratio of group VI metal oxides to group VIII metal oxides being between 1.25 and 20 by weight.

20. A process according to claim 2, in which the hydro-dehydrogenation component comprises a precious metal selected from the group consisting of platinum and palladium.

21. A process according to claim 2, in which, for the hydrotreatment catalyst, the concentration of group VIII metal, expressed as the weight with respect to the finished catalyst, is between 0.01% and 5% in the case of a precious metal and between 0.01% and 15% in the case of a non precious metal.

22. A process according to claim 2, in which the hydro-dehydrogenation component further comprises phosphorous in an amount, expressed as the weight of phosphorous oxide $P_2O_5$, of less than 15% with respect to the finished catalyst.

23. A process according to claim 1, wherein said precious metal dispersion is 30–100% and said precious metal distribution is above 0.2.

24. A process according to claim 1, wherein said support prior to impregnation is calcined by heat treatment at 300°–750° C. for 0.25–10 hours in 2–30% by volume of steam.

* * * * *